United States Patent [19]

Geist

[11] Patent Number: 4,721,741
[45] Date of Patent: Jan. 26, 1988

[54] HEAT-HARDENABLE BINDER MIXTURE

[75] Inventor: Michael Geist, Münster, Fed. Rep. of Germany

[73] Assignee: BASF Lacke+Farben AG, Muenster, Fed. Rep. of Germany

[21] Appl. No.: 913,978

[22] Filed: Oct. 1, 1986

Related U.S. Application Data

[62] Division of Ser. No. 764,620, Aug. 12, 1985, Pat. No. 4,661,410, which is a division of Ser. No. 679,062, Dec. 6, 1984, Pat. No. 4,581,294, which is a division of Ser. No. 425,528, Sep. 28, 1982, Pat. No. 4,505,981.

[30] Foreign Application Priority Data

Nov. 19, 1981 [DE] Fed. Rep. of Germany ....... 3145714

[51] Int. Cl.$^4$ ...................... C08L 33/04; C08L 33/08; C08L 33/10
[52] U.S. Cl. .................................. 523/400; 524/507; 524/539; 525/107; 525/123
[58] Field of Search ................ 523/400; 524/507, 539; 525/113, 123, 107

[56] References Cited

U.S. PATENT DOCUMENTS

| | | | |
|---|---|---|---|
| 4,181,645 | 1/1980 | Kinoshita | 525/113 |
| 4,319,016 | 3/1982 | Kurobe et al. | 427/385.5 |
| 4,353,819 | 10/1982 | McFadden | 427/386 |
| 4,361,594 | 11/1982 | Winterbottom | 427/386 |

*Primary Examiner*—Allan M. Lieberman
*Attorney, Agent, or Firm*—Gilbert L. Wells

[57] ABSTRACT

The heat-hardenable binder mixture based on organic resins comprises an organic resin having primary and-/or secondary and, if appropriate, also additional tertiary amino groups and a cross-linking agent based on an organic compound containing at least 2 carbalkoxymethyl groups. The binder mixture can additionally contain pigments, fillers, cross-linking catalysts, corrosion inhibitors and further finish auxiliaries. The binder mixture is used in a process for preparing coatings by applying a coating agent in the form of a film to a substrate and subsequently hardening the film by baking.

6 Claims, No Drawings

HEAT-HARDENABLE BINDER MIXTURE

This is a division of application Ser. No. 764,620, filed Aug. 12, 1985, now U.S. Pat. No. 4,661,410, which in turn is a division of application Ser. No. 679,062, filed Dec. 6, 1984, now U.S. Pat. No. 4,581,294, which in turn is a division of application Ser. No. 425,528, filed Sept. 28, 1982, now U.S. Pat. No. 4,505,981.

BACKGROUND OF THE INVENTION

The invention relates to a heat-hardenable binder mixture based on organic resins.

Many and varied chemical reactions have been proposed, and also used, to harden, by cross-linking, the binders in finish coatings. The chemical bonds formed during the cross-linking reaction frequently do not satisfy all the requirements placed on the finish films. For instance, ester bonds are sensitive to hydrolysis, and amine groups form hydrophilic imperfections in the baked film.

In the two-component systems one of the reactive groups must frequently be blocked to prevent premature reaction.

In recent years, electrocoating has become widely established for the priming of electrically conductive substrates. The emphasis has hitherto been on anodic electropriming. The resin binders used for this purpose belong to the resins containing carboxyl groups, for example to the maleiate oils, maleiated epoxide resins, alkyd resins, acrylic resins and, in particular, to the maleiated polybutadiens. These resins were rendered soluble in water by salt formation, chiefly with amines, and deposited by the current at the anode in the electrocoating bath. However, the anoide electropriming process contains serious disadvantages. For instance, oxygen is evolved at the anode during the electrical deposition and can modify the resins depositing at the anode in a serious, unfavourable manner. Furthermore, metal ions enter into solution at the anode and are contained in the baked film as imperfections. The metal ions can lead to discoloration and spots. They cause qualitative disadvantages in particular by salt formation and hence by reducing the resistance to water and the anticorrosion protection.

The cathodic electropriming process developed in recent years to commercial maturity is increasingly displacing the anodic process, since the defects described above are largely avoided. For instance, hydrogen, which does not affect the resin binder, is formed during the deposition step at the cathode, where the finish film is now deposited. Since the cathodic deposition can take place in the approximately neutral pH range, there are hardly any metal ions going into solution. The binders suitable for cathodic deposition contain predominantly amino groups which are neutralized with acids to obtain solubility in water.

However, a disadvantage is the fact that hydrophilic amino groups remain in the baked film and are responsible for a reduction of the anti-corrosion protection. Although the reaction of the amino groups with blocked isocyanates in the cross-linking converted the amino groups into the less hydrophilic urethane group, blocking agents, such as, for example, phenol or ketoximes, are liberated at the same time.

Depending on the type of structure of the amino group necessarily contained in the resin, these groups can also be thermally eliminated by β-elimination (German Offenlegungsschrift No. 2,363,074, and German Offenlegungsschrift No. 2,753,861). The resulting contamination of the off-air by large amounts of eliminated protective groups of the blocked isocyanates and amines must also be considered a disadvantage of this process.

SUMMARY OF THE INVENTION

The object of the invention is to avoid these disadvantages of the state of the art and to provide a binder mixture for the preparation of coating agents which produce coatings having excellent technological properties. The binder mixture according to the invention is intended to reduce environmental pollution when the corresponding coating agents are applied.

This object is achieved according to the invention when a binder mixture of the type mentioned at the outset comprises the components (A) an organic resin having primary and/or secondary and, if appropriate, also additional tertiary amino groups and (B) a cross-linking agent based on an organic compound containing at least two carboxymethyl ester groups.

The binder mixture, in addition to components A and B, advantageously contains, as component C, pigments, fillers, cross-linking catalysts, corrosion inhibitors and further finish auxiliaries.

Advantageously the content of component A is 50 to 95% by weight and of component B 5–50% by weight, the total amount of components A and B being 100%.

DESCRIPTION OF THE PREFERRED EMBODIMENTS

During the baking step, the carbalkoxymethyl ester groups of component B now react with the primary and/or secondary amino groups of component A to form an amide bond. The basic nitrogen of the amino group of the resin of component A is thus converted in the baked film into a pH neutral amide nitrogen. The baked film thus contains fewer basic imperfections. The cross-linking mechanism is described in principle in the following reaction scheme:

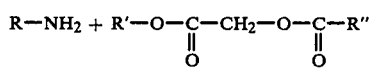

$$\downarrow \Delta T, \text{ if appropriate catalyst}$$

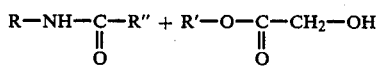

Virtually no amino groups are eliminated during baking, and off-air problems are thus reduced. The hydroxyacetates eliminated advantageously have a boiling point which is such that they can, with advantage, act as flow control agents during the baking step.

The amide bond formed during the baking has a very favourable effect on the adhesion of the film, in particular to metal substrates. The elasticity of the film is also increased by this fact. This cross-linking mechanism occasions high resistance of the finish film to solvents, alkali and salt mist. Even on sheet iron not pretreated, the films form very resistant coatings even without corrosion inhibitors.

Component A of the binder mixture advantageously has a number average molecular weight of 500 to 20,000, preferably of 600 to 10,000. The amine equivalent weight of component A of the binder mixture is 150 to 7,500, preferably 200 to 5,000.

Component A is an organic resin having primary and/or secondary amino groups. Tertiary amino groups can also be present in addition, if appropriate.

The primary and/or secondary amino groups are preferably introduced into the organic resin to prepare component A by reacting a polyamine and/or an amino and/or hydroxyl-containing ketimene with resins containing at least 1, preferably at least 2, epoxide groups or isocyante groups per molecule.

Component A can, however, also be obtained by other addition reactions, for example by esterifying or amidating compounds carrying primary and/or secondary amino groups with resins containing groups suitable for this purpose.

Epoxide-containing resins having, preferably, terminal epoxide groups from the group consisting of the polyglycidyl ethers, polyglycidyl esters and polyglycidylamines are found to be particularly suitable for preparing component A.

Other advantageously suitable epoxide-containing resins are copolymers of glycidyl acrylate and/or methacrylate or of another olefinically unsaturated, polymerizable compound carrying a glycidyl group with alkyl and/or hydroxyalkyl acrylates and/or methacrylates, and/or or vinyl compounds such as styrene, vinyltoluene or vinylcarbazole.

A further particularly suitable group of resins is partially epoxidized polybutadiene oils.

Polyglycidal ethers within the scope of this invention are understood as being preferably those polyglycidal ethers which have the general formula

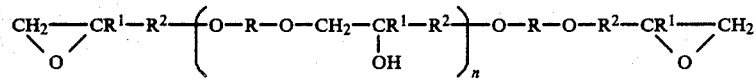

with

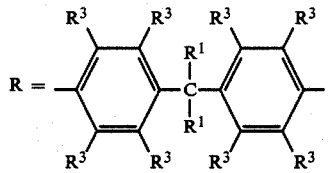

$R^1$ = H or $C_nH_{2n+1}$
$R^2$ = $(CR^1_2)$ n
$R^3$ = $R^1$, Halogen or, preferably H, and
n = 0 to 5

Polyglycidyl ethers of the general formula shown have a number average molecular weight of about 340 to 5,000 and, accordingly, an epoxide equivalent weight of 170 to 2,500. The epoxide resins can also be used in hydrogenated or partially hydrogenated form. To control film properties, some of the reactive groups of the epoxide resin can be reacted with other compounds. Suitable for this purpose are:

(a) carboxyl-containing compounds, such as saturated or unsaturated monocarboxylic acids (for example benzoic acid, linseed oil fatty acid, 2-ethylhexoic acid, Versatic acid, aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid or dimethylolpropionic acid) and carboxyl-containing polyesters or (b) amino-containing compounds such as diethylamine or ethylhexylamine or diamines having secondary amino groups, such as, for example, N,N'-dialkylenediamine, such as dimethylethylenediamine, N,N'-dialkyl-polyoxyalkyleneamine, such as N,N'-dimethylpolyoxypropylenediamine, cyano-alkylated alkylenediamines, such as bis-N,N'-cyanoethyl-ethyldiamine, cyanoalkylated polyoxyalkyleneamines, such as bis-N,N-cyanoethylpolyoxypropylenediamine, polyaminoamides such as Versamides or the reaction product of one mole of diaminohexane with two moles of monoglycidylether or monoglycidyl ester, especially glycidyl esters of α-branched fatty acids such as Versatic acid, or (c) hydroxyl-containing compounds, such as neopentylglycol, bis-ethoxylated neopentyl glycol, neopentyl glycol hydroxypivalate, dimethylhydantoin-N,N'-diethanol, 1,6-hexanediol, 2,5-hexanodiol, but-2-ene-1,4-diol, but-2-yne-1,4-diol, hex-3-yne-2,5-diol or other alkynediols, 1,4-bis-(hydroxymethyl)-cyclohexane, 1,1-isopropylidene-bis-(p-phenoxyl)-2-propanol, trimethylolpropane, pentacrylthritol or amino-alcohols, such as triethanolamine, methyldiethanolamine or hydroxyl-containing alkylketimines, such as aminomethyl propane-1,3-diol-methyl isobutylketimine or tris-(hydroxymethyl)-aminomethane-cyclohexaneketimine, and also polyglycol ethers, polyesterpolyols, polyetherpolyols, or polycaprolactonepolyols of various functionality and molecular weights.

Instead of using polyglycidyl ethers based on bisphenol A it is also possible to use polyglycidyl ethers based on other parent components, such as triglycidyl isocyanurate, heterocyclic diglycidyl compounds or diglycidyl hydantoins.

Suitable polyglycidyl esters are reaction products of, for example, bis-glycidyl terephthalate or bis-glycidyl isophthalate with, for example bisphenol A. The epoxide equivalent weight of these products is between 200 and 2,500. To control film properties, some of the remaining, reactive glycidyl groups can be reacted with other compounds. The compounds mentioned above under a, b and c are suitable for that purpose.

Polyglycidylamines are understood as meaning those glycidyl-containing resins obtained by introducing glycidyl groups via, for example, epichlorohydrin into NH$_2$-functional resins.

Copolymers of glycidyl acrylate and/or methacrylate or of another olefinically unsaturated, polymerizable compound carrying a glycidyl group with esters of acrylic and/or methacrylic acid and polymerizable vinyl compounds having a number average molecular weight of 700 to 10,000 and an epoxide equivalent weight of 600 to 3,000 are also particularly suitable. Acrylates with $C_2$- to $C_8$-alcohols and methacrylates with $C_1$ to $C_4$-alcohols are preferable. The copolymers can contain further monomers, such as hydroxyalkyl(meth)acrylate or (meth)acrylamide. The copolymerization is effected in a well known way by solution, suspension or emulsion polymerization with the addition of free-radical initiators, such as peroxides, hydroperoxides, peresters or thermolabile azo compounds, and, if appreciate, molecular weight regulators.

Partially epoxidized polybutadien oils are understood as meaning reaction products obtained by reacting commercially available polybutadieno oils with peracids or with organic acid/$H_2O_2$ mixtures. The preparation method has been described, for example in Chemiker-Zeitung 95,857 et seq (1971).

The epoxide-containing resins are reacted with polyamines and/or an amino- and/or hydroxyl-containing ketimine. If the addition of compounds carrying primary and secondary amino groups is carried out in the form of their ketimines, the reaction conditions are to be controlled in such a way that no substances decomposing the ketimines remain in the reaction product. The preferable ketimines are reaction products of ketones and alkylamines or alkyldiamines containing hydroxyl or secondary amino groups and having the general structure of R—NH—R'—$NH_2$ or HO—R—$NH_2$ respectively. The ketimines have, for example, the following structure:

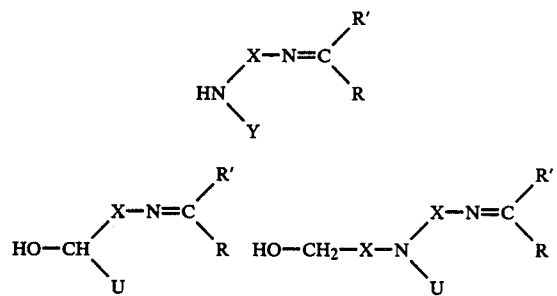

where
X=—$(CR_2)_n$—
R=—H, —R'
R'=—$C_mH_{2m+1}$, —$C_6H_{11}$
U=—R, —Y
Y=

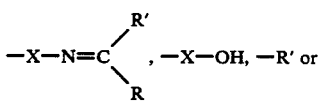

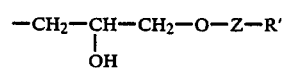

Z=>CO, —X
n=1–6 and
m=1–12

The ketones used for the reaction with the primary amino groups are generally aliphatic ketones, such as methyl ethyl ketone, diethyl ketone, methyl isobutyl ketone or ethyl n-propyl ketone, and cycloaliphatic ketones, such as cyclopentanone and cyclohexanone. The preferable amino alkylamines and alkanolamines are chiefly diethylenetriamine, N-methylethylenediamine, N-methylpropyl-enediamine, N-aminoethylpiperazine, 2-aminoethanol, 1-aminopropan-2-ol, 1-aminopropan-3-ol, 2-amino-2-methyl propan-1-ol, 3-amino-2,2dimethyl propan-1-ol, 1,5-diaminopentan-3-ol or N-(2-aminoethyl)-N-(2-hydroxy-ethyl)-ethylenediamine.

The exothermal addition of the amino ketimines described above to the epoxide groups of the base resin of binder component A is in general effected at room temperature. For complete conversion, the reaction is frequently completed at temperatures between 50° and 125° C.

The addition of the hydroxyketimines to the epoxide groups of the base resin of binder component A is as a rule carried out within the same temperature range, but the use of a basic catalyst, such as N,N-dimethylbenzylamine or of a Friedel-Crafts catalyst such as tin-II-chloride, is advisable.

It is also possible to use base resins having at least 2 isocyanate groups as the base resin of binder component A. Preferable resins containing isocyanate groups are higher-functional polycyanates prepared by trimerization or oligomerization from diisocyanates or polyisocyanates and polyfunctional compounds containing OH or NH groups. Typical isocyanates are toluylene diisocyanates, hexamethylene diisocyanates, 4,4'-diphenylmethane diisocyanate, 4,4'-dicyclohexylmethane diisocyanate, 1,6-diisocyanato-2,2,4-trimethylhexane and 1-isocyanato-methyl-3-isocyanato-1,5,5-trimethylcyclohexane. Isocyanate-containing prepolymers based on polyglycol ethers, polyesterpolyols, polyetherpolyols, polycaprolactone-polyols or polyaminoamides can also be used with advantage.

Binder component B, the cross-linking agent, is a compound which contains at least 2 carbalkoxymethyl ester groups. The cross-linking agent can be a low molecular weight compound or a correspondingly substituted resin. If an alcohol without a carbalkoxy group, such as mono-alcohols such as methyl, ethyl or butyl alcohol, is used for the esterification, the amidation reaction proceeds too slowly.

The cross-linking rate in this case is too low, and the baked film is not sufficiently resistant to solvents. These disadvantages are circumvented, when, in accordance with the invention, carbalkoxymethyl esters are used for the amidation reaction. The compounds which form the cross-linking agent are preferably polyester resins, but it is also possible to use other compounds containing free carboxyl groups to which the carbalkoxymethyl groups can become attached. These compounds can also contain primary, secondary or tertiary nitrogen atoms to be protonated with acid. In order for the resins to become soluble in water, they can also be modified with ammonium groups or by sulfide/acid or phosphine/acid mixtures.

The amidation components preferably used are poly-(carbalkoxymethyl)esters of polycarboxylic acids. These include, inter alia,
bis-(carbalkoxymethyl) azelate,
bis-(carbalkoxymethyl) sebacate,
bis-(carbalkoxymethyl) adipate,
bis-(carbalkoxymethyl) decanate, and
bis-(carbalkoxymethyl) terephthalate.

Polyfunctional cross-linking agents can also be advantageously prepared in the following way. First, equivalent amounts of a dicarboxylic anhydride (phthalic anhydride, hexahydrophthalic anhydride, trimellitic anhydride, or succinic anhydride) are reacted with a polyol (glycerol, trimethylolpropane, pentaerythritol or dipentaerythritol) at temperatures below 145° C. The acidic intermediate product formed is then reacted by generally known methods, to which this invention does not relate, to give carbalkoxymethyl esters.

Component B is advantageously a polyacrylate resin of the following monomers:

(a) 10–50% by weight of alkyl acrylate having 1 to 18 carbon atoms in the alkyl radical and/or alkyl methacrylate having 2–18 carbon atoms in the alkyl radical, (b) 0–60% by weight of methyl methacrylate, (c) 0–35% by weight of styrene, α-methylstyrene, o- and/or p-chlorostyrene, p-tert.-butylstyrene, vinyl-toluene and/or vinylcarbazole and (d) 2–65% by weight of carbalkoxymethyl methacrylate and/or carbalkoxymethyl acrylate or of another olefinic, unsaturated polymerizable compound containing carbalkoxy-methyl ester groups, the total amount of constituents a, b, c and d being 100%.

The binder mixture according to the invention can be present in finely divided, solid form or dissolved in an organic solvent.

For electrocoating, it is necessary that the binder mixture, after protonation with acid, is present in the form of an aqueous solution or dispersion. The solubility in water of the binder component and/or of the cross-linking component is effected by neutralizing with acids the primary, secondary and/or tertiary amino groups contained therein. Suitable acids are in particular organic acids, but it is also possible to use, for example, hydrochloric acid or phosphoric acid. The amino groups are preferably neutralized with formic acid, acetic acid, malonic acid, lactic acid or citric acid.

The acids mentioned can also be used when the solubilizing groups for the binder component and/or the cross-linking component are introduced by adding an ammonium group or the salt of a sulfide/acid or phosphine/acid mixture to the binder or the cross-linking agent.

The degree of neutralization of the solubilizing groups is, relative to these groups, between 0.2 and 1.0 equivalent, preferably between 0.25 and 0.6 equivalent, of acid.

The neutralization can also be carried out as follows. The acid is initially introduced in water, if appropriate together with dispersing auxiliaries, and the resin solution is stirred into the water at room temperature or, if appropriate, at elevated temperatures. However, the acid can also be added directly to the resin solution. The neutralized resin solution can then be stirred into the water, but, if appropriate, the water can also be slowly incorporated in the resin solution.

The dispersion, to control its viscosity, the deposition voltage and the flow, can contain up to 20% of organic solvents. If the batch contains too much solvent, due to the preparation method chosen, or even solvent harmful to the properties, these solvents can be distilled from the resin solution before the dispersing or they are distilled from the aqueous dispersion. A proportion of organic solvents which is as low as possible is advantageous for the sum of all properties.

The solids content of a deposition bath made up with the dispersion according to the invention, is 7–35 parts by weight, but preferably 12–25 parts by weight. The pH value of the deposition bath is between 4 and 8, but preferably between 5 and 7.5. Non-corroding steel anodes or graphite anodes are used as the anodes of the deposition bath. The temperature of the made-up bath should be between 15° and 35° C., preferably between 20° and 30° C. The deposition time and voltage are so chosen that the layer of thickness desired is obtained.

After the deposition, the coated article is rinsed off and is ready for baking.

Regardless of the application method of the coating agent prepared on the basis of the binder mixture according to the invention, the finish film is cross-linked during baking at temperatures of 130° to 200° C. for a period of 10–60 minutes, preferably at 150° to 180° C. for 15–30 minutes.

The amidation reaction can be further accelerated by suitable catalysts. Catalysts suitable for this purpose are in particular ammonium compounds such as benzyltrimethylammonium hydroxide, benzyltrimethylammonium chloride, trimethylcetylammonium bromide or tetraammonium iodide and organic tin compounds, such as dibutyltin dilaurate, and iron(III) acetylacetonate, zinc acetate, zinc 2-ethyl-hexoate, cobalt naphthenate, lead acetate or butyl titanate.

Pigmentation is effected in a well-known way. In this step, the pigments as well as customary additives, such as fillers, corrosion inhibitors and anti-foam agents, are incipiently milled in one of the two binder components. Possible milling units are, for example, sand mills, hall mills or three-roll mills. The finish can be completed in a generally known manner.

Individual components A and B and, if appropriate, component C can be mixed in the form of their concentrated solutions and conjointly dispersed. However, it is also possible to disperse components A and B individually, in which case the pigments have been incipiently ground in A or B, and to mix the dispersion of the individual components in the ratio necessary.

The invention also relates to a process for preparing coatings by baking by applying a coating agent in the form of a film to a substrate, where the coating agent contains a binder mixture comprising the mixture of two components (A) an organic resin having primary and/or secondary and, if appropriate, also additional tertiary amino groups and (B) a cross-linking agent based on an organic compound containing at least two carbalkoxymethyl ester groups.

Advantageous embodiments of the process according to the invention are as follows:

(1) the mixture, in addition to components A and B, contains, as component C, pigments, fillers, cross-linking catalysts, corrosion inhibitors and further finish auxiliaries;

(2) the content of component A is 50–95% by weight and of component B 5–50% by weight, the total amount of components A and B being 100%;

(3) component A has a number average molecular weight of 500 to 20,000;

(4) component B has a number average molecular weight of 200 to 10,000;

(5) component B is a polyacrylate resin of the following monomers:

(a) 10–50% by weight of alkyl acrylate having 1 to 18 carbon atoms in the alkyl radical and/or alkyl methacrylate having 2–18 carbon atoms in the alkyl radical;
(b) 0–60% by weight of methyl methacrylate;
(c) 0–35% by weight of styrene, α-methylstyrene, o- and/or p-chlorostyrene, p-tertbutylstyrene, vinyltoluene and/or vinylcarbazole; and
(d) 2–65% by weight of carbalkoxymethyl methacrylate and/or carbalkoxymethyl acrylate or of another olefinic, unsaturated polymerizable compound containing carbalkoxymethyl ester groups, the total amount of constituents (a), (b), (c) and (d) being 100%;
(6) the coating agent is present in finely divided, solid form;
(7) the coating agent is applied by an electrostatic powder spray device;
(8) the binder mixture is present dissolved in an organic solvent;
(9) the coating agent is applied by spraying, dip-coating, flow-coating, roll-coating, knife-coating, or the like; and
(10) an electrically conductive substrate is immersed in an aqueous bath which contains a coating agent which is at least partially neutralized by acid and which, if appropriate, additionally contains organic solvents, and is connected as the cathode, the film is deposited on the substrate by means of direct current, the substrate is removed from the bath, and the film is hardened by baking.

The invention also relates to the use of a binder mixture for preparing coatings, which comprises the mixture of components
(A) an organic resin having primary and/or secondary and, if appropriate, also additional tertiary amino groups and
(B) a cross-linking agent based on an organic compound containing at least two carbalkoxymethyl ester groups.

Advantageous embodiments of their use according to the invention are as follows:
(1) the mixture, in addition to components A and B contains, as component C, pigments, fillers, cross-linking catalysts, corrosion inhibitors and further finish auxiliaries;
(2) the content of component A is 50–95% by weight and of component B 5–50% by weight, the total amount of components A and B being 100%;
(3) component A has a number average molecular weight of 500 to 20,000;
(4) component B has a number average molecular weight of 200 to 10,000;
(5) component B is a polyacrylate resin of the following monomers:
(a) 10–50% by weight of alkyl acrylate having 1 to 18 carbon atoms in the alkyl radical and/or alkyl methacrylate having 2–18 carbon atoms in the alkyl radical,
(b) 0–60% by weight of methyl methacrylate
(c) 0–35% by weight of styrene, α-methylstyrene, o- and/or p-chlorostyrene, p-tert.-butylstyrene, vinyltoluene and/or vinylcarbazole, and
(d) 2–65% by weight of carbalkoxymethyl methacrylate and/or carbalkoxymethyl acrylate or of another olefinic, unsaturated polymerizable compound containing carbalkoxymethyl ester groups, the total amount of constituents (a), (b), (c) and (d) being 100%;
(6) the binder mixture is present in finely divided, solid form and is used for powder finishes;
(7) the binder mixture is present dissolved in an organic solvent and is used for baking finishes;
(8) the binder mixture, after protonation with acid, is present in the form of an aqueous solution or dispersion and is used for cathodic electrocoating; and
(9) the finely divided, solid form is used for aqueous powder slurries.

Below, the invention is illustrated in more detail by means of illustrative embodiments.

EXAMPLE 1

Preparation of a tetrafunctional cross-linking agent.

109 g of pentacrythritol are mixed with 474 g of phthalic anhydride in a 4-necked flask equipped with a reflux condenser, stirrer, internal thermometer and gas inlet tube, and the mixture is heated under nitrogen to 140° C. The reaction then proceeds exothermally and is maintained at 160° C. by cooling. The batch is cooled down to room temperature at an acid number of 305, and 300 g of acetone are added. 81 g of triethylamine are then added, and 98 g of ethyl chloroacetate are added dropwise. The mixture is then heated to reflux temperature. The temperature is maintained for 4 hours, and the batch is then allowed to cool down. The triethylammonium chloride formed is filtered off after 12 hours. The acetone is removed from the filtrate in a rotary evaporator.

EXAMPLE 2

Preparation of a polyfunctional cross-linking agent 142 g of trimethylopropane, 723 g of caprolactone and 600 g of methyl isobutyl ketone are initially introduced into a reaction vessel and heated to reflux temperature. 609 g of trimellitic anhydride are added after 6 hours. When the acid number of 228 has been reached, the batch is cooled down to 50° C., a further 600 g of methyl isobutyl ketone are added, and 641 g of triethylamine are slowly added dropwise. The temperature is maintained at 60° C. by cooling. 685 g of methyl chloroacetate are then added. The reaction is carried out for 4 hours at 60° C. The batch is then cooled down to room temperature and the salt formed is filtered off. The solids content of the cross-linking resin is 70%.

EXAMPLE 3

Preparation of a polyfunctional cross-linking agent based on a polyacrylate resin 560 g of xylene are initially introduced under nitrogen into a 5 l reactor and heated to reflux temperature. A monomer mixture of 1,400 g of methyl methacrylate, 560 g of carbethoxymethyl methacrylate, 840 g of ethylene hexyl methacrylate and 14 g of dodecylmercaptan are added dropwise in the course of 4.5 hours. 140 g of tert-butyl peroctoate and 200 g of xylene are metered in at the same time. The batch is then polymerized until a constant viscosity of 4.0 dPa.s, 50% strength in xylene, has been reached. The solids content is then adjusted with xylene to 70%.

The number average molecular weight, measured by gel permeation chromatography against a polystyrene standard, is 2,100.

EXAMPLE 4

Preparation of a dispersion of component A 1,188 parts by weight of bis-(4-hydroxycyclohexyl)-2,2-propanebisglycidyl other, 308 parts by weight of bisphenol A, 675 parts by weight of polytetrahydrofuran (molecular weight 1,000) and 189 parts by weight of xylene are initially introduced into a 4 l reactor. 5 parts by weight of dimethylbenzylamine are added as a catalyst. The mixture is heated to 170° C. and maintained at this temperature for half an hour. The mixture is then cooled down to 136° C., and a further 10 parts by weight of dimethylbenzylamine are added. The temperature is maintained until an epoxy equivalent weight of 1,500 is reached. The batch is then cooled down to 85° C., and 725 parts by weight of the 70% strength crosslinking solution (Example 2) are added. The temperature is allowed to increase again to 85° C., and 515 parts by weight of a 70° strength solution of 1 mole of diethylene triamine and 2 moles of methyl isobutyl ketone are added. The batch warms up during this addition. The temperature is maintained between 95° and 100° C. for 60 minutes by external cooling.

In the meantime a mixture of 4,070 parts by weight of deionized water, 81 parts by weight of acetic acid and 21 parts by weight of a commercially available defoamer has been prepared. The resin described above is then dispersed in this mixture. The dispersion has a solids content of 40% and a degree of neutralization of the amine groups of 33%. A further 970 parts by weight of water are added after an hour to establish a solids content of 35%.

EXAMPLE 5

Preparation of a pigment paste containing component A, for an electrocoating bath The batch described in Example 4, to prepare an organic resin, is repeated, but discontinued before the dispersing step and worked up as follows. For this purpose, a water/acetic acid mixture (162 g of acetic acid plus 64 g of water) is added to the batch to effect 100% neutralization of the amine groups. A solids content of 50% is then established with deionized water.

The pigment paste is prepared from the following components:
2,380 g of 50% strength resin solution
1,600 g of charcoal dust
200 g of lead silicate
1,200 g of deionized water The starting materials are comminuted in a grinding unit to a Hegman fineness of 6 to 7. A further amount of deionized water is then added to obtain the consistency desired. The pigment paste has a solids content of 56.1%, a resin content of 21.8% and a pigment solids content of 34.3%. The paste has excellent thermal stability on storage.

EXAMPLE 6

Preparation of an electrocoating bath 2,434.5 g of deionized water are added to 287.5 g of the binder described in Example 4 and 178 g of the pigment paste described in Example 5. The solids content of the deposition bath resulting from the mixture is 16%. The pH value is 7.5%. The breakthrough voltage of the bath is 370 to 380 v. Steel sheets treated with zinc phosphate are coated for 120 seconds at a bath temperature of 25° C. and at a voltage of 300 volts. This produces continuous films which, after 20 minutes baking at 160° C., afford a smooth, firmly adhering layer of 30 μm.

EXAMPLE 7

Preparation of a dispersion of component A

In a 6 l reactor, 1,453 g of a 90% strength solution of the ketimine of monoisopropanolamine and methyl ethyl ketone, in methyl ethyl ketone, are added to 3,380 g of partially epoxidized polybutadien (molecular weight 2,600, 4.8% by weight of epoxide oxygen), and 32.5 g of phenol are added as catalyst. The mixture is heated to 160° C. and maintained at this temperature until epoxide oxygen is no longer detectable. The batch is then cooled down to 90° C., and a solution, adjusted to a solids content of 70%, of the cross-linking agent of Example 3 is added. The crosslinking agent solution is mixed in for 15 minutes. The batch is then dispersed in a mixture of 6,210 g of deionized water, 281 g of lactic acid and 55 g of a commercially available defoamer. The dispersion has a solids content of 40% and a degree of neutralization of the amine groups of 40%.

EXAMPLE 8

Preparation of a pigment paste 146 g of a reaction product of an epoxide resin having an epoxide equivalent weight of 890 and diethanolamine/lactic acid salt are initially introduced together with 199 g of deionized water. 200 g of $TiO_2$, 48 g of extender based on aluminum silicate, 11 g of lead silicate and 3 g of carbon black are added. The starting components are comminuted in a grinding unit to a Hegman fineness of 5–7. A further 102 g of deionized water are then added to obtain the paste consistency desired. The grey pigment paste has a very long shelf life.

EXAMPLE 9

Preparation of an electrocoating bath 500 parts by weight of the binder dispersion described in Example 7 and 196 parts by weight of the pigment paste described in Example 8 are mixed with 804 parts by weight of deionized water. The content of nonvolatile fractions in the made-up bath is 20%. This deposition bath has a pH value of 6.2. Films deposited on zinc-phosphatized metal sheets for 2 minutes at 300 volts and baked for 30 minutes at 170° C. have a smooth, hard non-yellowed surface. The film thickness is 25 μm. The adhesion to the metal sheets is excellent.

I claim:

1. A heat-hardenable binder mixture based on organic resins, comprising:
    (A) 50% to 95% by weight of an organic resin having amino groups selected from the group consisting of primary groups, secondary groups and mixtures thereof, a number average molecular weight of 500 to 20,000 and an amine equivalent weight of 150 to 7,500; and
    (B) 5% to 50% by weight of a cross-linking agent based on an organic compound containing at least two carbalkoxymethyl groups, a number average molecular weight of 200 to 10,000, said organic compound selected from the group consisting of polyester resins and compounds containing free carboxyl groups to which said carboxymethyl can be attached, the total amount of components (A) and (B) being 100%.

2. The binder mixture of claim 1, contains in addition to components A and B a component C comprising pigments, fillers, cross-linking catalysts, corrosion inhibitors, and further finish auxiliaries.

3. The binder mixture of claim 1, wherein component B is a polyacrylate resin of the following monomers:
 (a) 10-50% by weight of alkyl acrylate having 1 to 18 carbon atoms in the alkyl radical, alkyl methacrylate having 2-18 carbon atoms in the alkyl radical and mixtures thereof;
 (b) 0-60% by weight of methyl methacrylate;
 (c) 0-35% by weight of styrene, -methylstyrene, o-chlorostyrene, p-chlorostyrene, p-tert,-butylstyrene, vinyltoluene, vinylcarbazole, and mixtures thereof; and
 (d) 2-65% by weight of carbalkoxymethyl methacrylate, carbalkoxymethyl acrylate, another olefinic, unsaturated polymerizable compound containing carbalkoxymethyl ester groups and mixtures thereof; the total amount of constituents (a), (b), (c) and (d) being 100%.

4. The binder mixture of claim 1, present in finely divided, solid form.

5. The binder mixture of claim 1, present dissolved in an organic solvent.

6. The binder mixture of claim 1, which is protonated with acid and is present in the form of an aqueous solution or dispersion.

* * * * *